Figure 1:
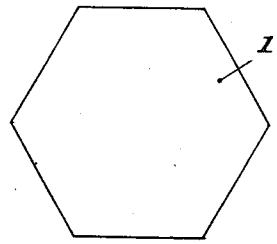

Dec. 23, 1941.  E. P. DESBRUÈRES  2,266,961
PROCESS FOR MANUFACTURING THE OUTSIDE PIECE OF A TWO-PIECE SAFETY NUT
Filed July 14, 1937   3 Sheets-Sheet 1

E. P. Desbruères
INVENTOR

By: Glascock Downing &...
Attys

Dec. 23, 1941.  E. P. DESBRUÈRES  2,266,961
PROCESS FOR MANUFACTURING THE OUTSIDE PIECE OF A TWO-PIECE SAFETY NUT
Filed July 14, 1937  3 Sheets-Sheet 2
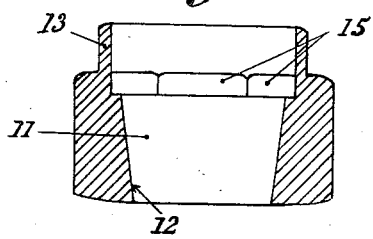
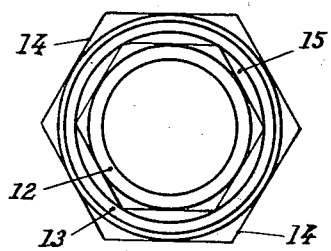
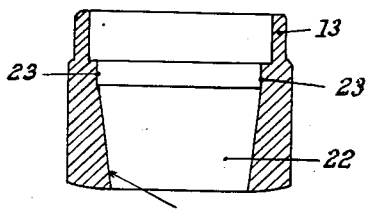
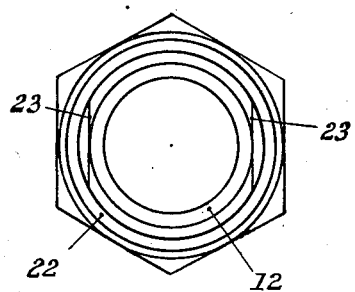
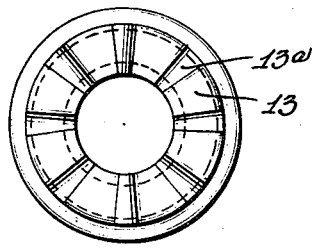
E. P. Desbruères
INVENTOR
By Glascock Downing & Seebold
Attys.

Dec. 23, 1941. E. P. DESBRUÈRES 2,266,961
PROCESS FOR MANUFACTURING THE OUTSIDE PIECE OF A TWO-PIECE SAFETY NUT
Filed July 14, 1937 3 Sheets-Sheet 3

E. P. Desbruères
INVENTOR

By Glascock Downing Seebold
Attys.

Patented Dec. 23, 1941

2,266,961

UNITED STATES PATENT OFFICE 2,266,961

PROCESS FOR MANUFACTURING THE OUTSIDE PIECE OF A TWO-PIECE SAFETY NUT

Edmond Pierre Desbruères, Paris, France, assignor to Societe Securits E. D. L. C., Paris, France, a corporation of France Application July 14, 1937, Serial No. 153,642
In Austria July 16, 1936

5 Claims. (Cl. 10—76)

I have filed an application in Austria on July 16, 1936, and in Japan on June 12, 1937.

The invention relates to a process of manufacture by press and in the cold state of the outer part of a two-piece nut, which has in particular a conical inner wall. This manufacturing process makes it possible to produce with a press an outer part which has not only an inner conical wall, but also surfaces for driving the inner part and a flange that is sufficiently thin to be easily folded over at right angles and sufficiently high so that, when folded over, it forms a strengthening crown, which is in the neighborhood of the threads of the bolt, which is to be screwed into the finished nut. Outwardly this part will be preferably hexagonal. Such a piece can be made on a lathe; but its cost price, and consequently that of the nut, when finished, would be absolutely prohibitive. In order to produce a finished nut at a cost that is commercially marketable, it is natural to seek for it by means of the cold process with a press. It could, moreover, be conceived that according to the press work methods at present known it would be easy to produce the said outer part by such means.

Indeed, it is well known, that it is possible to produce a flange by using a punch driven by a press to act upon a metal blank; but this process is used in the manufacture of cap nuts wherein the threaded opening does not extend entirely through the nut to expose the end of the bolt upon which the nut is threaded.

It is also known that blanks can be cut from a sheet of metal, and that these blanks are first subjected to the action of a tapered punch which produces the conical cavity. The blank is then perforated and a small flange is made at the same time. But this improved form of nut is particularly adapted where a nut is to be secured to a sheet of material and where two pieces of sheet material are to be bolted together either in contact or separated by a hollow wall.

Blanks are also cut from a sheet of metal, and they are pushed into a cavity in order to be folded in the form of a cup and at the same time perforated in their centre; but the nut so formed is destined to be secured to a strip of material having an opening to receive the projection or protrusion of the nut.

Safety nuts have also been made in one piece in such a manner that a flange concentric with the hole of the nut is produced with a press upon a perforated blank whose outline is hexagonal, such flange being subsequently folded over toward the inside and then threaded, as also the nut.

It is also known that a self-locking nut can be made by simply stamping it from a piece of sheet-iron. Thus the outer member is stamped from a disc-shaped blank of uniform thickness by a single die. This method with the aid of a single die is possible because it is simply a matter of stamping a single sheet of material; but such process would not be applicable if mild steel sheets were used.

Nuts have also been made with a press by using previously heated iron tubes.

These different manufacturing processes for manufacturing nuts by means of a press, gave reason to suppose that it would be easy to manufacture also with a press the outer part of the safety nut as described. However, it was not sufficiently observed that in the known processes the deformation of the material is comparatively small in connection with the production of this outer part. Therefore, when it was thought it would suffice to act with a punch, the section would correspond to the inner section of the outer part, it was recognized, after long tests, that either the tools broke under the violence of the shock or that the products obtained were so imperfect that they could not be used. It was therefore necessary to abandon the plan of manufacturing this outer part by the known processes.

However, by a process of division of manufacture, it was possible to produce with a press and this outer part in perfect condition for use, so that a safety nut of absolutely perfect efficiency could be obtained at a sufficiently low cost price to make it marketable.

This process for manufacturing the outside piece of a two-piece safety-screw whose inside piece is split longitudinally is threaded on the inside and whose outer wall is conical in shape and perfectly smooth consists in cutting out from a metal plate of suitable thickness blanks of a desired shape; in placing a blank in a matrix provided with a cavity just large enough to receive it; in giving this blank a stroke of a press with a punch of appropriate shape so as to hollow out its centre and make the metal rise around the punch; finally in giving it a second stroke of the press with a second punch which produces an inside conical wall and the necessary expansion in order to give it a radial resistance sufficient for it not to be deformed and to be able to bear the vibrations whatever may be their frequence and their intensity.

Figure 4:
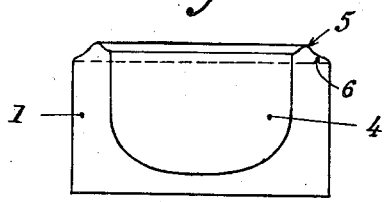
Figure 2:
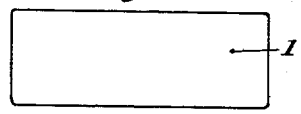
Figure 5:
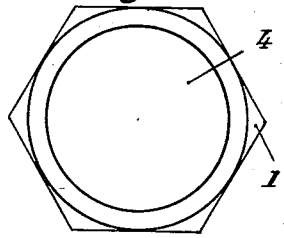
Figure 3:
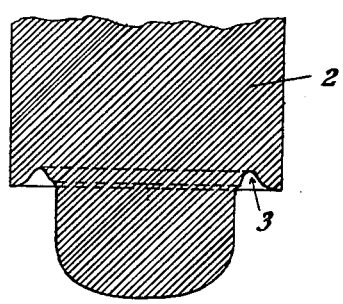
Figure 6:
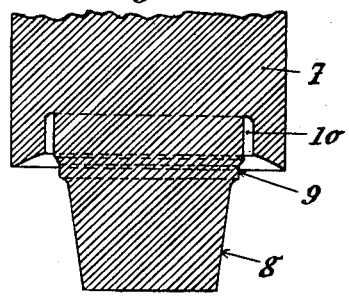

In the accompanying drawings which show solely by way of an example a form of realisation of the manufacturing process according to the invention and different forms of execution of this outside piece:

Figs. 1 and 2 show a blank in plan and elevation which is destined to the manufacture of the outside piece according to the invention, Fig. 3 shows in section the punch intended to hollow out a blank, Fig. 4 shows in section a blank being pressed with the punch shown in Fig. 3, Fig. 5 is a plan of Fig. 4, Fig. 6 shows in section the second punch intended to finish the outside piece, Fig. 7 shows in axial section view the outside piece produced by means of the manufacturing process according to the invention, Fig. 8 is a plan view of Fig. 7.

Figure 11:
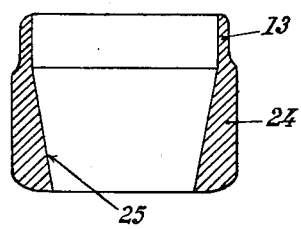
Figure 12:
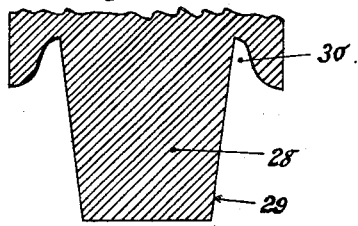
Figure 13:
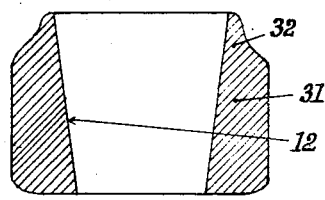
Figure 14:
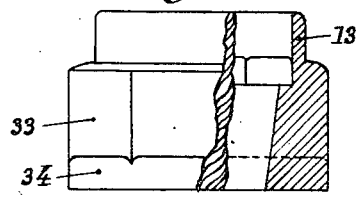
Figure 16:
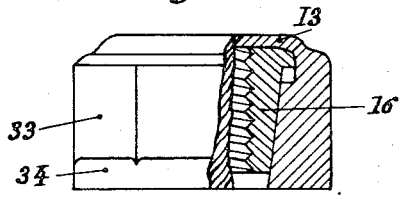
Figure 15:
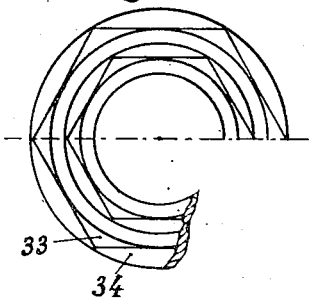

Figs. 9 and 10 are similar views to the Figs. 7 and 8 of a second form of execution of the outside piece, Fig. 11 is axial section of the outside piece of a third form of execution, Fig. 11a is a top plan detail of the outside piece shown in Fig. 11 when bent inwardly, Fig. 12 shows in section a punch intended to facilitate the manufacture of the outside piece of a screw of great diameter, Fig. 13 is a vertical axial section view of the preparatory outside piece obtained with the punch represented in Fig. 12, Fig. 14 shows in elevation with a vertical section of one side and partial rending a form of execution of the outside piece when the screw is destined to bear particularly violent vibrations, Fig. 15 is a plan of the Fig. 14, Fig. 16 shows in elevation with vertical section of one side and partial rending the finished screw provided with the outside piece represented in Figs. 14 and 15.

From a metal plate of suitable thickness are punched some blanks 1 the section of which is preferably hexagonal. Each blank is then placed in a cavity of die placed underneath punch 2 which is shown in section in Fig. 3. This punch 2 which is rounded at the bottom has near its lateral face a circular groove 3. Under the action of a stroke of the press blank 1 is hollowed out as shown at 4 in Fig. 4; a relief 5 is marked, and the corners 6 above the edges of the blank have been cut off. Blank in this prepared state is stroked by a second punch 7. This punch 7, whose bottom face is flat, has a conical lateral face 8, and above a vertical hexagon wall 9 a cylindrical vertical slot 10, the depth of which is previously determined with great care. A stroke of the press is given with punch 7 with the result that, after unstopping, an outer part 11, as shown in Fig. 7, is obtained. This outside piece 11 has a conical wall inside 12 and a neck 13 at its widest or upper part, this neck, as it has already been explained, has a rectangular cross-section, is about half as thick as the outside piece 11 at its thinnest part and its height is such that, when it is folded down towards the centre of the screw, nearly at right angles, it forms a crown, the inside edge of which is as near as possible of the thread of the bolt on which the screw will be screwed. This piece 11 is hexagonal owing to the shape which was chosen in cutting out the blank 1 and therefore possesses sides 14 which serve for screwing and unscrewing. Above the conical part 12 is an hexagon 15 which is produced by the hexagon wall 9 of the punch 7.

The form of execution of the outside piece 22, as shown in Figs. 9 and 10, is obtained by replacing this hexagonal wall 9 of the punch 7 by a cylindrical wall provided with two flats intended to produce the two flats 23 of the outside piece 22.

The form of execution of the outside piece 24 as shown in Fig. 11 is obtained by simply prolonging the conical wall 8 of the punch 7 as far as the vertical cylindrical groove 10. Thus the interior wall 25 of the outside piece 24 is perfectly smooth as far as the neck 13. To avoid the outside and inside pieces from turning one inside the other, the inside piece is provided with notches into which the neck 13 penetrates when it is bent over the inside piece as shown at 13a in Fig. 11a.

Practice has shown that, for the manufacture of outside pieces of big screws, for instance those of 24 mm. in diameter, with two punches; the edges of the second punch 7 (Fig. 6) are rapidly blunted; so that the hexagon 15 and even the neck 13 are not long obtained with the desired perfection. So that the punch 7 is rapidly out of use. This involves a large expense which has to be repeated often.

Repeated trials have shown that it would be possible to remedy these inconveniences by using an intermediary punch represented in Fig. 12. This punch 28 only requires a conical side 29 the generatrix of which is the same as 8 of punch 7. This side 29 has at its superior extremity a circular cavity 30 destined to produce at the superior part of the outline 31 a slender part 32. When the punch 7 is afterwards plunged in the rough piece 31, the side 8 is guided by the side 12 to the rough piece 31; the hexagonal side 9 produces the hexagon 15 and the vertical cylindrical groove 10 produces the neck 13. So that the hexagon and the neck are obtained perfectly without the punch 7 having to make such a considerable effort as it would have to if it manufactured the outside piece 11 directly starting from the hollow blank represented in 4 (Fig. 4).

The form of execution for the outside piece shown in Figs. 14 and 15 is equally obtained by the process of manufacturing described above. But the matrix in which the blank 1 is lodged has in its base a cavity of appropriate shape and dimensions which permits one to obtain an outside piece 33 with shoulder 34.

The outside piece 33 provided with its neck 13 and its shoulder 34 receives the inside piece; the neck 13 is then, as in the former case, bent over with a press which gives the screw shown in Fig. 16.

The adjunction of the shoulder does not only increase the radial resistance of the bottom part of the outside piece and allow the screw to undergo the most violent vibrations; but also increases very noticeably its bearing surface; so that the axial pressure of the screw by the unity of the surface is noticeably diminished.

Numerous alterations of details might be made in the construction of the process for the manufacture of the outside piece in the different forms of execution of the safety-screw according to the present application without affecting the principle of the invention.

What I claim is:

1. The method of manufacturing the outer part of a two-piece safety nut of the type wherein said nut comprises an externally prismatic piece having a conical hole, and a conical inner piece non-rotatable in said first piece, which inner piece is split longitudinally, and is retained in said external piece by means of an inwardly folded collar on said external piece, consisting in first hollowing out in the form of a cup, a hexagonal blank of soft steel, thereafter punching out a conical hole in said blank and simultaneously producing a slender neck portion, and finally producing a collar on said blank by driving the metal of said blank into the hollow crown of the punch, while simultaneously producing an inner polygonal fitting adjacent said collar.

2. The method of manufacturing the outer part of a two-piece safety nut of the type wherein said nut comprises an externally prismatic piece having a conical hole, and a conical inner piece non-rotatable in said first piece, which inner piece is split longitudinally, and is retained in said external piece by means of an inwardly folded collar on said external piece, consisting in hollowing out in the form of a cup by means of a punch, a hexagonal blank of soft steel, and thereafter subjecting said hollowed out blank to the action of a second punch having a conical part and above a cylindrical vertical wall showing shapings and above a vertical slot, the depth of which is determined exactly, said punch at the same time producing the punching of the cup; producing the conicity of the inner hole of the piece; producing shapings on the inner surface of the said piece near its upper edge, said shapings cooperating with corresponding shapings of the inner part of the nut and preventing the relative rotation of said pieces and driving the metal into the hollow slot of the said punch for forming a neck portion of such a height that after being folded inwardly its edge adjoins as near as possible the threads of the bolt upon which the nut is threaded.

3. The method of manufacturing the outer part of a two-piece safety nut of the type wherein said nut comprises an externally prismatic piece having a conical hole, and a conical inner piece non-rotatable in said first piece, which inner piece is split longitudinally, and is retained in said external piece by means of an inwardly folded collar on said external piece, consisting in hollowing out in the form of a cup by means of a punch, a hexagonal blank of soft steel, and thereafter subjecting said hollowed out blank to the action of a second punch having a conical part and above a cylindrical vertical wall of polygonal section and above a vertical slot, the depth of which is determined exactly, said punch at the same time producing the punching of the cup; producing the conicity of the inner hole of the piece; producing polygonal surfaces on the inner surface of the said piece near its upper edge, said polygonal surfaces cooperating with corresponding polygonal surfaces of the inner part of the nut and preventing the relative rotation of said pieces and driving the metal into the hollow slot of the said punch for forming a neck portion of such a height that after being folded inwardly its edge adjoins as near as possible the threads of the bolt upon which the nut is threaded.

4. The method of manufacturing a two-piece safety nut including in addition to that of claim 3 the step of folding said collar inwardly into complementary holes formed in the widest portion of the conical inner piece of said nut.

5. The method of manufacturing a two-piece safety nut including an outer piece having a conical hole, a conical inner piece, means for preventing the relative movement of said pieces with respect to each other and a reinforcing shoulder on the lower portion of the external piece for giving said external piece a supporting surface, said nut occupying the same space as an ordinary nut and capable of resisting violent vibrations regardless of their frequency and intensity, the said method consisting in shaping a blank by a first stroke of the press and at the same time by a second stroke of the press punching the cup, producing the conicity of the inner hole, producing suitable shapings on the inner wall of the cavity and a shoulder on the lower portion of the external piece by means of a punch, the profile of which corresponds to that which must be given to the interior of the external piece.

EDMOND PIERRE DESBRUÈRES.